United States Patent Office 3,340,259
Patented Sept. 5, 1967

3,340,259
PROCESS FOR MAKING BIS DIAMINO ALKYNES
James F. Vitcha, New Providence, and George L. Moore, South Plainfield, N.J., assignors, by mesne assignments, to Cumberland Chemical Corporation, New York, N.Y., a corporation of Delaware
No Drawing. Original application Jan. 20, 1961, Ser. No. 90,209, now Patent No. 3,268,524, dated Aug. 23, 1966. Divided and this application Mar. 10, 1965, Ser. No. 438,755
7 Claims. (Cl. 260—246)

This is a division of application Ser. No. 90,209, filed Jan. 20, 1961, now U.S. Patent 3,268,524.

This invention relates to acetylenic nitrogen compounds, more particularly diamino alkynes, and to improved methods of preparing such compounds.

Although procedures are known for the preparation of nitrogen compounds of the acetylene series, i.e., nitrogen compounds having triple unsaturated carbon linkages, by the reaction of amines, acetylene and aldehydes, such procedures have not, in general, proved commercially feasible. The yields in these prior art methods, for example, tend to be low, and, moreover, because of the nature of the prior art reactions, side products and by-products are formed to a considerable extent, and great difficulty is experienced in recovering the reaction products.

According to the invention described herein, commercially feasible procedures for preparing nitrogen compounds of the acetylene series which avoid or alleviate many of the problems encountered in the prior art have been discovered.

In accordance with the present invention, there have been prepared diamino butynes having the formula:

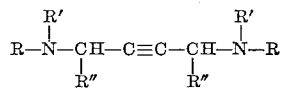

In the foregoing formula, R may be an aliphatic, aryl, alkyl aryl or alicyclic hydrocarbon radical; R' may be an aliphatic, aryl, alkyl aryl or alicyclic hydrocarbon radical or hydrogen; or the part

may represent a heterocyclic base, namely, piperidine, morpholine or pyrrolidine.

When R and R' are hydrocarbon radicals, these will usually have fewer than 20 and preferably fewer than 10 carbon atoms in the chain. Typically, R and R' may be aliphatic hydrocarbon radicals, such as propyl, isopropyl, n-butyl, isobutyl, tertiary butyl, hexyl, 2-ethyl hexyl, isononyl, n-nonyl, 3,5,5-trimethylpentyl, 1,1,3,3-tetramethylbutyl, and the like, including the isomeric alkyl derivatives thereof. R and R' may also be alicyclic hydrocarbon radicals, such as cyclopentyl, cyclohexyl, cycloheptyl, cyclooctyl, and so forth. When R and R' are aryl or alkyl aryl groups, these may have one or more uncondensed benzene nuclei. Preferably, however, R and R' have one uncondensed benzene nucleus. Typical of such groups may be mentioned phenyl and its homologues, such as tolyl, xylyl, and so forth.

In the formula above, R" may be hydrogen or a lower alkyl radical having up to 6 carbon atoms. Usually R" will be hydrogen, as will be clear from the following description.

As will be more clear from the following description, the groups R, R', or the part

in the above formula will correspond to the radicals making up the primary or secondary amines or cyclic imines used to prepare the acetylenic nitrogen compounds. The group R" will correspond to the hydrocarbon radical making up the carbonyl compounds used in the reactions, or hydrogen.

These and other amino compounds of the acetylene series, i.e., amino compounds having triple unsaturated carbon linkages, are prepared by reacting amines, including cyclic imines, having at least one active hydrogen attached to the amino nitrogen, aldehydes and acetylene in an inert reaction medium and in the presence of catalysts.

The reaction is carried out in two steps or stages: First, a mono-amino alkyne is prepared. Then, the acetylene atmosphere is removed, additional aldehyde is charged to the reactor, and the second step or stage is completed by addition of a second portion of the amine, using the same conditions as employed in the first step or stage of the reaction. The reaction proceeds stepwise according to the following equations:

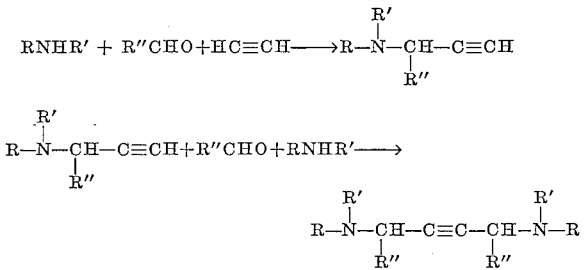

As will be noted, acetylene is a reagent only in the first step.

As catalysts suitable for carrying out the above reactions may be mentioned the heavy metals of subgroups I-B and II-B of the Periodic Table of elements and their compounds, as, for example, organic and inorganic salts of copper and the other heavy metals of these subgroups, such as the chloride, acetate, formate, and the like. Also may be mentioned the acetylides of such heavy metals, for example, acetylene-copper compounds. Other catalysts, such as Adkins Catalyst, i.e., copper-barium chromite, may also be used. Among the catalysts, the copper salts, and more particularly the cupric salts, are especially suitable. Particularly good results are obtained with cupric chloride, and this material is preferred.

The catalysts or mixtures thereof may, if desired, be used with suitable inert carriers, such as, for example, finely divided alumina, diatomaceous earth, silica, silica gel, kieselguhr, and mixtures of the foregoing.

Primary and secondary amines, as well as cyclic imines, and mixtures of the foregoing, are useful in preparing the acetylenic amino compounds described herein. When aliphatic amines are used, these may be primary or secondary amines having straight chains or branched chains typified, as partially indicated above, by the following: methyl, ethyl, propyl, isopropyl, n-butyl, isobutyl, tert.-butyl, hexyl, 2-ethylhexyl, isononyl, n-nonyl, 3,5,5-trimethylpentyl, 1,1,3,3-tetramethylbutyl groups and the isomeric alkyl derivatives thereof. When secondary amines are used the hydrocarbon radicals attached to the amino nitrogen may be the same or different. As will be clear from the examples, best results are achieved with the secondary amines. As examples of the saturated monocyclic heterocyclic amino compounds, or, more properly, cyclic imines, may be mentioned morpholine, piperidine and pyrrolidine. Both primary and secondary aryl or alkyl aryl amines may be used, depending upon the type of acetylenic amino compounds desired. Of the aryl compounds, the aromatic amines having a single benzene nucleus are preferred. Among these may be mentioned aniline, toluidine, xylidine, and the mono-alkyl derivatives thereof, such as monomethyl aniline, monoethyl aniline, and other mono-alkyl phenyl amines having up to about 10 carbon atoms in the alkyl group. Typical of the alicyclic amines may be mentioned cyclopentylamine, cyclohexylamine, cycloheptylamine, cyclooctylamine, and the like. Also may be mentioned the mono-substituted alicyclic amines, such as cyclopentyl ethyl amine, cyclohexyl methyl amine, and the like. When primary and secondary amines are used, these preferably have fewer than a total of 20 carbon atoms. Other suitable amines and cyclic imines will readily suggest themselves to those skilled in the art from the foregoing description.

The reaction of the above described amino nitrogen compounds with acetylene and aldehydes is carried out in an inert solvent medium. Care should be exercised in selecting the solvent to prevent undesirable by-product and side-product formation and to avoid tedious recovery procedures. It has also been discovered that the choice of reaction medium has a significant effect on the yields achieved.

In general, non-polar solvents which are inert to both the starting materials and the reaction products and which are readily volatilizable may be used. Among such solvents, saturated or unsaturated aliphatic hydrocarbons which are liquid at atmospheric conditions are especially suitable. Preferred for use are saturated aliphatic hydrocarbons having 6 to 19 carbon atoms.

The aldehydes suitable for use in the present invention may be described as simple aldehydes having one carbonyl radical. Although carrying out the reaction with aldehydes containing more than 1 carbonyl radical is feasible, in general, the use of such materials causes undesirable side reactions. Among the particularly important aldehydes may be mentioned formaldehyde, including Formalin (an aqueous solution of about 37 percent by weight of formaldehyde) and Methyl Formcel (a solution of about 55 percent by weight of formaldehyde in methanol), acetaldehyde, and other simple aldehydes having fewer than about 6 carbon atoms. The precursors of formaldehyde, e.g., the cyclic trimer known as trioxan, and the linear polymers of formaldehyde, known as polyoxymethylenes, as well as the cyclic polymer of acetaldehyde, known as paraldehyde, may be advantageously employed.

Although any of the above described aldehydes may be used, it has been discovered that greatly superior results are obtained in preparing compounds of the formula described hereinabove when linear polymers of formaldehyde are used. Such polymers are polyoxymethylenes of the formula $HOCH_2-O-[CH_2O]_n-CH_2OH$, where $n$ is an integer up to 100. Especially good results are obtained when trioxymethylene, which is commonly referred to as paraformaldehyde, is employed, and this material is preferred.

The acetylene used in the reaction may be highly concentrated acetylene, or acetylene diluted with foreign gases which are inert to the reaction. Electric arc acetylene, for example, may be used.

The method of contacting the reactants is important. Thus, it has been discovered that greatly improved yields are obtained by suspending the aldehyde in an inert non-polar solvent containing the catalyst, subjecting this reaction medium to an atmosphere comprising acetylene, and adding the amine to the resulting environment.

Care should be taken in adding the amine to avoid the presence of excess unreacted amine in the reaction medium. Thus, too rapid an addition of the amine results in decreased yields of desirable products and production of by-products, side products and tars. The rate of addition of the amine should be slow enough so as to avoid the presence of excess unreacted amine in the reaction mixture. In general, the rate of addition of the amine should be such that at any given time less than about 25 mole percent, and preferably less than about 10 mole percent of unreacted amine is present in the reaction mixture, based upon the moles of unreacted aldehyde in the reaction mixture. The rate of addition of the amine, in terms of moles of amine per minute per mole of aldehyde in the reaction mixture, may vary between about 0.0005 and 0.15, is usually between about 0.005 and 0.015, and is preferably between about 0.0025 and 0.030.

The proportion of amine to aldehyde is also important. In general, the molar ratio of amine to aldehyde may vary between about 0.80 and 1.20:1 and is preferably between about 1.0 and 1.10:1. When polymers of the aldehydes are employed, the above described molar ratios are based upon moles of equivalent aldehyde and not moles of the polymers. When paraformaldehyde is used, for example, a molar ratio of amine to paraformaldehyde of between about 1.0 and 1.10:1 is preferred, and a molar ratio of about 1.05:1 is optimum, the molar ratios being based on HCHO.

If desired, the reaction may be carried out under anhydrous conditions, and in some instances, this may be preferable. Any suitable dehydrating agent which is inert to reactants and to the products of reaction may be used to take up the water produced by the reaction. Such dehydrating agents are well understood in the art. As a typical example may be mentioned anhydrous sodium sulfate.

The temperature and pressure of reaction should be high enough to cause reaction to occur, but below the temperature and pressure at which tar and undesirable side products and by-products form. The temperature of reaction may vary between about 40° C. and 90° C., or higher, and is preferably between about 50° C. and 60° C. At the lower part of the range, the reaction appears to be sluggish, while at the upper part of the range, secondary products, as well as side products and tars, tend to form. Although the reaction may be carried out at pressures between about 2 and 40 atmospheres, reaction pressures of between about 125 to 250 p.s.i.g. are especially advantageous, and are preferred.

The invention will be more fully understood from the following examples, which, although illustrative, are not intended to limit the scope of the invention, except as such limitations may appear in the claims.

*Example 1*

The reactor comprises a one-liter, upright, stainless steel autoclave equipped with an agitator, thermocouple well, acetylene gas burette, liquid amine burette, a proportioning pump for the liquid amine burette, and a pressure regulator for the acetylene gas burette.

Seventy-five grams of anhydrous n-hexane, 59.4 grams of paraformaldehyde (90% trioxymethylene), which have been dessicated over sodium hydroxide pellets, and 6.02 grams of anhydrous powered cupric chloride are charged to the autoclave liner. The autoclave is assembled, and pressure tested by purging with nitrogen. The system is then purged with acetylene, bled off to 25 p.s.i.g., and then heated to 60° C. Acetylene is then added to bring the pressure up to 150 to 175 p.s.i.g. and maintained at this pressure throughout the reaction by means of the gas burette and pressure regulator. The acetylene used is purified by passing it through a Dry Ice trap and activated alumina.

Diethylamine having a boiling point of 55° to 56° C. at 1 atmosphere pressure is charged to the amine burette.

The diethylamine is added to the reaction mixture in the autoclave over a period of about three and one-half hours at a uniform rate of about 0.65 grams/minute. The proportioning pump is used to insure a uniform rate of addition. The total charge of diethylamine is 137.2 grams. At the completion of the amine addition, the reaction is continued until no more acetylene is taken up. This point is reached approximately one hour after completion of the diethylamine addition. At the end of this first stage of the reaction, the percent conversion of the diethylamine to acetylenic amines is 90.1% of theoretical. Of this conversion, an 83.0% yield of propargyl diethylamine and a 7.1% yield of bis(diethylamino) butyne are achieved. The acetylene atmosphere is removed and an additional charge of 59.5 grams of paraformaldehyde is charged to the reactor. An additional 137.2 grams of diethylamine is then added to the reactor at a uniform rate, which is controlled by the proportioning pump. It should be noted that in this procedure, acetylene is a reagent only in the first step. The mixture is then cooled and discharged from the autoclave.

The mixture is filtered through a medium sintered glass Buchner funnel. The small filter cake obtained is washed once with a small portion of n-hexane and the filter cake is discarded. Caution is necessary to insure that the filter cake is not allowed to dry. After washing, dilute hydrochloric acid is added immediately to destroy any copper acetylide present.

A small water layer which appears in the filtrate is separated and discarded.

The hexane layer is then distilled through a small Vigreux column under reduced pressure with the pressure being lowered gradually as the distillation progresses. A nitrogen atmosphere is maintained during the distillation. The conversion to 1,4-bis(diethylamino)-2-butyne is comparable to the yield of propargyl diethyl amine achieved in the first stage of the reaction. The amount of diethylamine recovered indicates that the diethylamine has combined in practically stoichiometric proportions with the paraformaldehyde.

*Example 2*

Example 1 is repeated, with the exception that morpholine is substituted for diethylamine. Comparable results are achieved, the main product being 1,4-bis(morpholine)-2-butyne.

*Example 3*

For comparison purposes, the first stage of Example 1 is repeated, with the exception that Formalin (a 37% by weight aqueous solution of formaldehyde) is used in place of the n-hexane and paraformaldehyde. The yield of propargyl diethylamine is 59.5% of theoretical, and the yield of bis(diethylamino) butyene is 6.1% of theoretical, for a total yield of acetylenic amines of 65.6%, which is considerably below that obtained in Example 1 at the end of the first stage.

*Example 4*

For comparison purposes, the first stage of Example 1 is again repeated, with the exception that Methyl Formcel (a 55% solution of formaldehyde in methanol) is used in place of n-hexane and paraformaldehyde. Other conditions are identical to those of Example 1. A 49.5% conversion to amino propyne and a 2.3% conversion to diamino butyne are achieved at the end of the first stage.

*Example 5*

The first stage of Example 1 is again repeated, with the exception that the ratio of diethylamine and paraformaldehyde to n-hexane and catalysts was doubled. Yields comparable to those at the end of the first stage of Example 1 are obtained.

*Example 6*

The first stage of Example 1 is repeated, with the exception that dibutylamine is substituted for diethylamine. Yields of propargyl dibutyl amine and bis(dibutylamino) butyne comparable to the yields indicated at the end of the first stage in Example 1 are obtained.

*Example 7*

The first stage of Example 1 is repeated, with the exception that dimethylamine is substituted for diethylamine. Yields of propargyl dimethylamine and bis(dimethylamino) butyne comparable to the yields indicated in Example 1 are obtained, at the end of the first stage.

*Example 8*

The first stage of Example 1 is repeated, with the exception that the cyclic imine, morpholine, is substituted for diethylamine. Yields of 8.3% bis(morpholino) butyne and 72.6% of N-propargyl morpholine, for a total yield of 80.9% of acetylenic amino compounds at the end of the first stage are achieved.

*Example 9*

The first stage of Example 1 is repeated, with the exception that pyrrolidine is substituted for diethylamine. Yields of bis(pyrrolidino) butyne and N-propargyl pyrrolidine comparable to the yields indicated in Example 8 are achieved.

*Example 10*

The first stage of Example 1 is repeated, with the exception that piperidine is substituted for diethylamine. Yields of bis(piperidino) butyne and N-propargyl piperidine comparable to the yields indicated in Example 8 are achieved.

*Example 11*

Using the first stage procedure described in Example 1, N-ethylaniline is reacted with acetylene and paraformaldehyde in the presence of a cupric chloride catalyst and a n-hexane reaction medium at a temperature of 75° C. High yields of the interesting aromatic propyne, N-propargyl-N-ethylaniline are obtained at the end of the first stage.

The acetylenic amino nitrogen compounds described herein are valuable initial materials for the preparation of solvents, pharmaceuticals and dyestuffs. By themselves the acetylenic amino nitrogen compounds are effective corrosion inhibitors. Condensation products made therefrom are useful as pickling inhibitors, and the materials themselves may also be used as high energy fuels.

The invention in its broadest aspects is not limited to the specific compositions, steps and methods described, but departures may be made therefrom within the scope of the accompanying claims without departing from the principles of the invention and without sacrificing its chief advantages.

We claim:

1. A process which comprises forming an anhydrous mixture of paraformaldehyde, a hydrocarbon solvent, and a catalyst selected from the group consisting of salts and acetylides of copper, adding an atmosphere of acetylene on said mixture, and gradually adding to said mixture an amine selected from the group consisting of primary amines and secondary amines having up to 20 carbon atoms, said amines being selected from the group consisting of alkyl amines, cycloalkyl amines saturated monocyclic heterocyclic amines and monocyclic aromatic amines, and mixtures of the foregoing, said amine being added to said mixture at a uniform rate and at a temperature and pressure high enough to cause reaction to occur, continuing the reaction until substantially no acetylene is taken up by the reaction mixture, removing the acetylene atmosphere, charging additional paraformaldehyde to the mixture and adding additional amounts of said amine, the rate of addition of said amine being such that substantially no excess of unreacted amine is present in the reaction mixtures.

2. The method of claim 1, wherein the amount of unreacted amine in the reaction mixture is less than about 25 mole percent based upon the moles of unreacted paraformaldehyde present in said mixture.

3. The method of claim 1, wherein the mole rate of addition of the amine per minute per mole of paraformaldehyde in the reaction mixture is between about 0.0005 and 0.15.

4. The method of claim 1, wherein the temperature is between about 40° and 90° C. and the pressure is between about 2 and 40 atmospheres.

5. The method of claim 1, wherein the catalyst is cupric chloride.

6. The method of claim 1, wherein enough of said amine is added to provide a molar ratio of said amine to paraformaldehyde of between about 1 and 1.1:1, said ratio being based upon HCHO.

7. A process which comprises forming an anhydrous mixture of paraformaldehyde, a hydrocarbon solvent, and a catalyst selected from the group consisting of salts and acetylides of copper, adding an atmosphere of acetylene on said mixture, and gradually adding to said mixture an amine selected from the group consisting of primary amines and secondary amines having up to 20 carbon atoms, said amines being selected from the group consisting of alkyl amines, cycloalkyl amines saturated monocyclic heterocyclic amines, monocyclic aromatic amines, and mixtures of the foregoing, said amine being added to said mixture at a uniform rate and at a temperature and pressure high enough to cause reaction to occur, continuing the reaction until substantially no acetylene is taken up by the reaction mixture, removing the acetylene atmosphere, charging additional paraformaldehyde to the mixture and adding additional amounts of said amine, the rate of addition of said amine being such that substantially no excess of said unreacted amine is present in said reaction mixture, the amount of unreacted amine in the reaction mixture being less than about 25 mole percent based upon the moles of unreacted paraformaldehyde present in said mixture, the rate of addition of the amine per minute per mole of paraformaldehyde in the reaction mixture being between about 0.0005 and 0.15, the temperature being between about 40° and 90° C. and the pressure being between about 2 and 40 atmospheres, and the hydrocarbon solvent being a saturated hydrocarbon having 5 to 19 carbon atoms.

No references cited.

ALEX MAZEL, *Primary Examiner.*

J. TOVAR, *Assistant Examiner.*